(12) United States Patent
Kishimoto et al.

(10) Patent No.: US 10,272,358 B2
(45) Date of Patent: Apr. 30, 2019

(54) DISTILLATION APPARATUS

(71) Applicant: Kobe Steel, Ltd., Hyogo (JP)

(72) Inventors: Akira Kishimoto, Kobe (JP); Keiichiro Tomari, Kobe (JP); Masatake Toshima, Kobe (JP); Makoto Nishimura, Kobe (JP)

(73) Assignee: Kobe Steel, Ltd., Hyogo (JP)

( * ) Notice: Subject to any disclaimer, the term of this patent is extended or adjusted under 35 U.S.C. 154(b) by 186 days.

(21) Appl. No.: 15/303,454

(22) PCT Filed: Apr. 28, 2015

(86) PCT No.: PCT/JP2015/062845
§ 371 (c)(1),
(2) Date: Oct. 11, 2016

(87) PCT Pub. No.: WO2015/178179
PCT Pub. Date: Nov. 26, 2015

(65) Prior Publication Data
US 2017/0036138 A1    Feb. 9, 2017

(30) Foreign Application Priority Data
May 23, 2014    (JP) .................. 2014-106827

(51) Int. Cl.
*B01D 3/42*    (2006.01)
*B01D 3/32*    (2006.01)
*B01D 3/00*    (2006.01)

(52) U.S. Cl.
CPC .............. *B01D 3/42* (2013.01); *B01D 3/007* (2013.01); *B01D 3/32* (2013.01); *Y02P 70/34* (2015.11)

(58) Field of Classification Search
CPC ............. B01D 3/007; B01D 3/32; B01D 3/42
See application file for complete search history.

(56) References Cited

U.S. PATENT DOCUMENTS 4,390,396 A * 6/1983 Koblenzer ............. B01D 3/001
            134/12
6,589,395 B1   7/2003 Meili

FOREIGN PATENT DOCUMENTS

JP    S60-206401 A    10/1985
JP    H06-009641 B2   2/1994
(Continued)

OTHER PUBLICATIONS

International Search Report issued in PCT/JP2015/062845; dated Aug. 4, 2015.
(Continued)

*Primary Examiner* — Renee Robinson
*Assistant Examiner* — Derek N Mueller
(74) *Attorney, Agent, or Firm* — Studebaker & Brackett PC (57) ABSTRACT

A distillation apparatus includes a separator, a cooler, a heater, and a heat collection circuit. The heat collection circuit includes a circulation channel, a compressor, an expanding mechanism, a storing section capable of storing a working medium in a liquid state, and a circulation-amount adjusting section that adjusts a circulation amount of the working medium. The circulation-amount adjusting section adjusts an outflow amount of the working medium, which is stored in the storing section, to the circulation channel or an inflow amount of the working medium, which is circulating in the circulation channel, to the storing section such that the circulation amount increases or decreases according to an increase or a decrease in a flow rate of the first output fluid.

10 Claims, 5 Drawing Sheets

(56) References Cited

FOREIGN PATENT DOCUMENTS

| JP | 2000-051602   | 2/2000  |
|----|---------------|---------|
| JP | 2009-136713 A | 6/2009  |
| JP | 2011-196610 A | 10/2011 |
| JP | 2012-045449 A | 3/2012  |

OTHER PUBLICATIONS

Notification of Concerning Transmittal of International Preliminary Report on Patentability (Chapter I) and Translation of Written Opinion of the International Searching Authority; PCT/JP2015/062845 dated Dec. 8, 2016.

* cited by examiner

DISTILLATION APPARATUS

TECHNICAL FIELD

The present invention relates to a distillation apparatus.

BACKGROUND ART

There has been known a distillation apparatus that uses a distillation process. For example, Patent Literature 1 discloses a separation process module including a separator, a compressor, a heat exchanger, and a cooler. The separator separates input fluid including a first component and a second component different from the first component into first output fluid including the first component and second output fluid including the second component. The compressor compresses the first output fluid separated by the separator. The heat exchanger causes the first output fluid compressed by the compressor and the second output fluid separated by the separator to perform heat exchange. The cooler cools the first output fluid after performing the heat exchange in the heat exchanger. The first output fluid flowed out from the cooler and the second output fluid flowed out from the heat exchanger are respectively returned to the separator.

In this separation process module, thermal energy of the first output fluid flowed out from the separator is input to the heat exchanger, whereby the second output fluid flowed out from the separator is heated in the heat exchanger. That is, a reduction in thermal energy necessary for the heating of the second output fluid (energy saving) is achieved by efficient use of thermal energy of the first output fluid.

In the separation process module described in Patent Literature 1, the first output fluid flowed out from the separator is compressed by the compressor and then led into the heat exchanger, whereby the thermal energy of the first output fluid is collected. Therefore, when the first output fluid includes, as the first component, a component, direct compression of which is difficult, (e.g., a component that becomes extremely unstable during high pressure or a component that swells a seal section of the compressor), it is difficult to use the separation process module.

In a distillation plant described in Patent Literature 2, thermal energy of tower top vapor is input to a storage evaporator by using a heat pump. That is, in the distillation plant of Patent Literature 2, thermal energy of fluid flowed out from a top au column (a separator) is indirectly collected by using the heat pump without directly compressing the fluid in a compressor.

In a distillation apparatus described in Patent Literature 3, thermal energy of tower top, vapor is indirectly collected by a distillation reboiler by using a heat pump that uses water as a medium. Patent Literature 3 mentions that load adjustment of the heat pump is performed by adjustment of opening degrees of a compressor bypass and an inlet vane or by control of the number of revolutions of a compressor.

In the distillation apparatus described in Patent Literature 3, although the adjustment of the load of the heat pump is performed, there is a limit in an amount of the adjustment. In other words, in the distillation apparatus described in Patent Literature 3, it is difficult to flexibly cope with fluctuation in a flow rate of fluid flowed out from a top of a separator.

CITATION LIST

Patent Literature

Patent Literature 1: Japanese Unexamined Patent Publication No, 2017-045449

Patent Literature 2: Japanese Unexamined Patent Publication No. 2000-051602

Patent Literature 3: Japanese Examined Patent Publication No. H06-009641

SUMMARY OF INVENTION

An object of the present invention is to provide a distillation apparatus that is, even when first output fluid flowed out from a separator includes a component, direct compression of which is difficult, capable of effectively collecting thermal energy of the first output fluid and capable of effectively collecting the thermal energy of the first output fluid according to fluctuation in a flow rate of the first output fluid.

A distillation apparatus according to an aspect of the present invention includes: a separator that separates input fluid including a first component and a second component into first output fluid including the first component and second output fluid including the second component; a cooler for cooling the first output fluid flowed out from the separator; a heater for heating the second output fluid flowed out from the separator; and a heat collection circuit that includes a working medium and gives thermal energy, received from the first output fluid as a result of heat exchange of the working medium with the first output fluid in the cooler, to the second output fluid as a result of heat exchange of the working medium with the second output fluid in the heater. The heat collection circuit includes: a circulation channel that connects the cooler and the heater and circulates the working medium; a compressor that compresses the working medium having received the thermal energy from the first output fluid by performing heat exchange with the first output fluid in the cooler; an expanding mechanism that expands the working medium having given the thermal energy to the second output fluid by performing heat exchange with the second output fluid in the heater; a storing section connected to the circulation channel and being capable of storing the working medium in a liquid state; and a circulation-amount adjusting section that adjusts a circulation amount, which is a total amount of the working medium circulating in the circulation channel. The circulation-amount adjusting section adjusts an outflow amount of the working medium, which is stored in the storing section, to the circulation channel or an inflow amount of the working medium, which is circulating in the circulation channel, to the storing section such that the circulation amount increases or decreases according to an increase or a decrease in a flow rate of the first output fluid.

DESCRIPTION OF EMBODIMENTS

Preferred modes for carrying out the present invention are explained in detail below with reference to the drawings.

First Embodiment

A distillation apparatus in a first embodiment of the present invention is explained with reference to FIG. 1 and FIG. 2.

Figure 1:
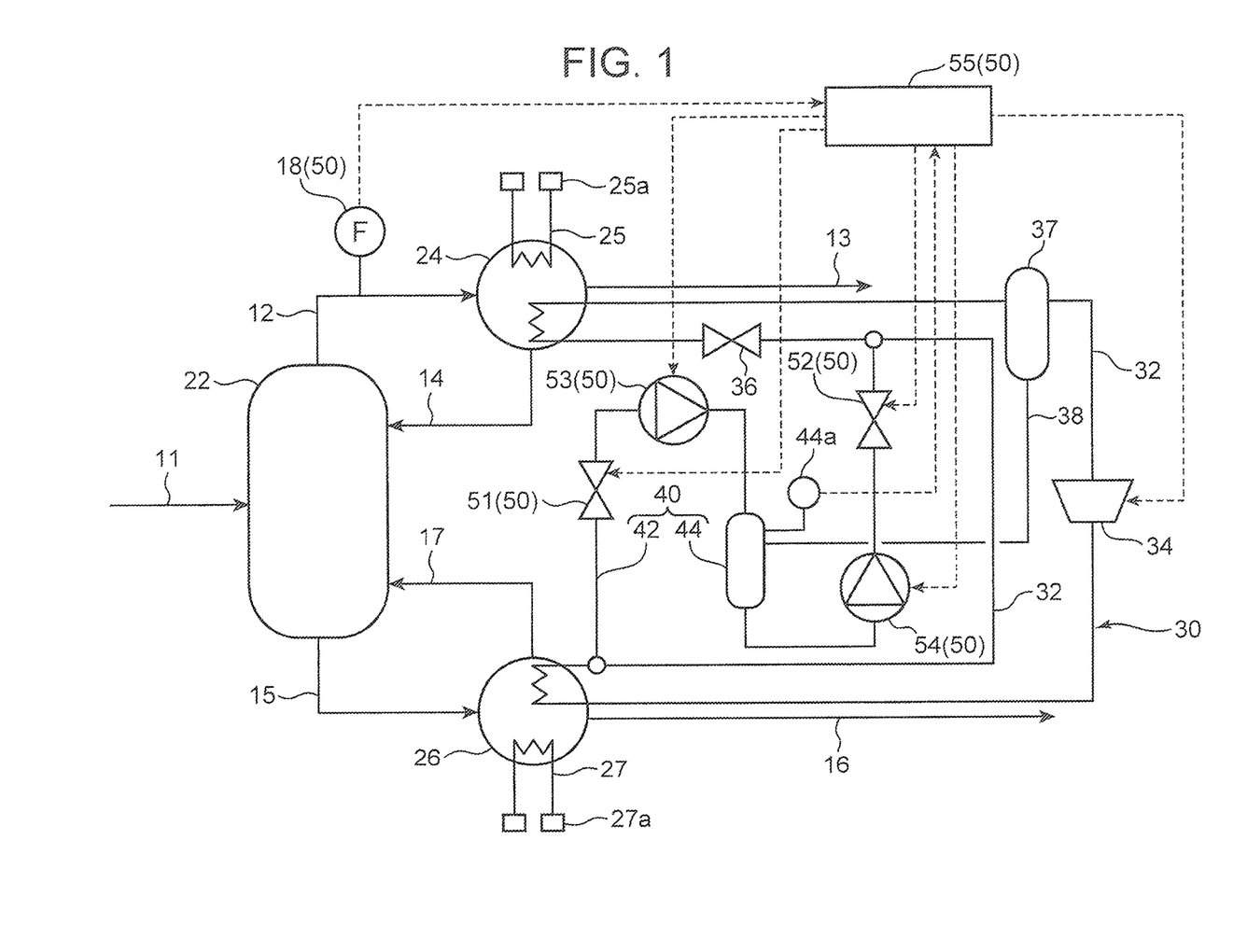
FIG. 1 is a diagram showing an overview of the configuration of a distillation apparatus in a first embodiment of the present invention.
Figure 2:
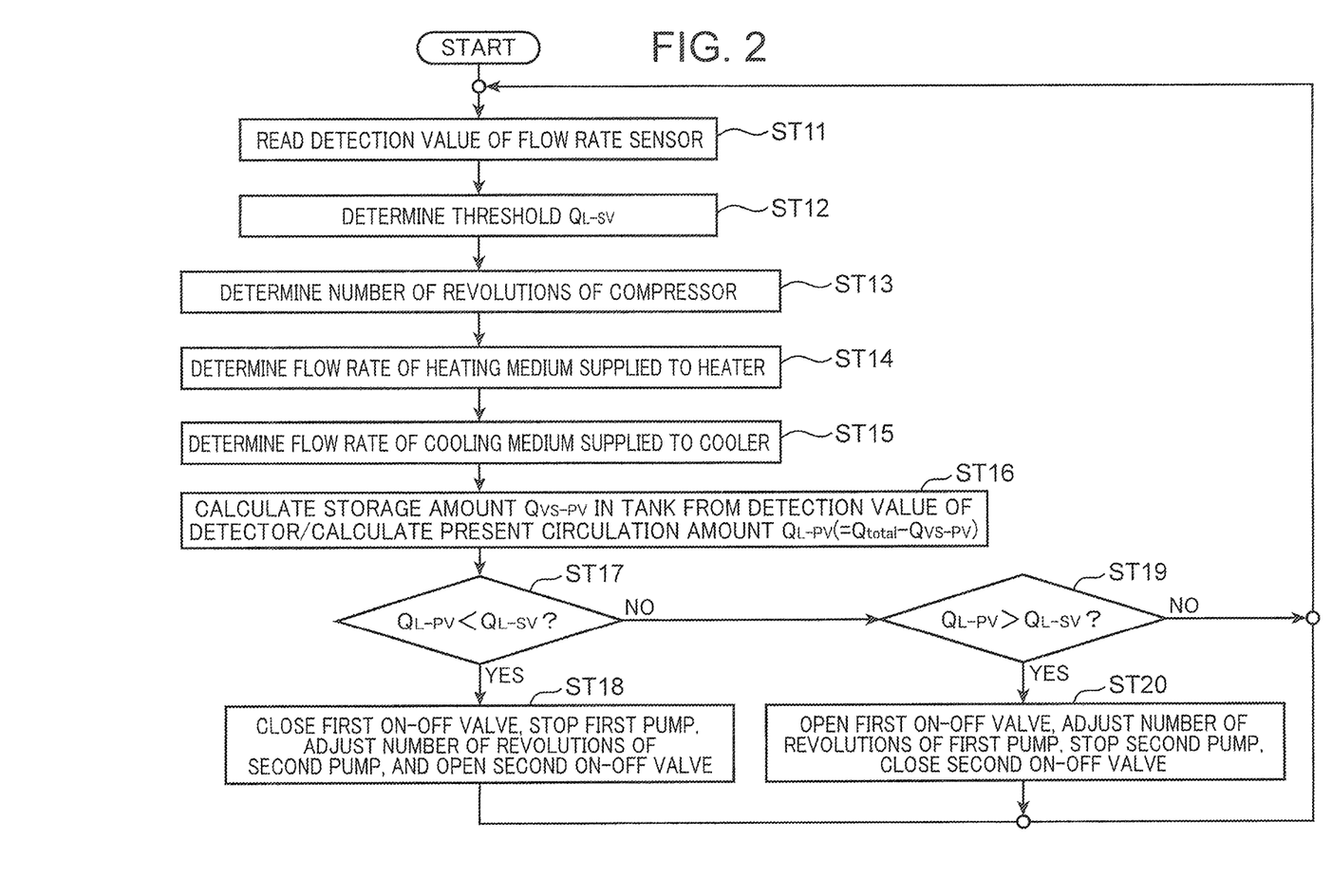
FIG. 2 is a flowchart showing control content of a control section of the distillation apparatus shown in FIG. 1.

As shown in FIG. 1, the distillation apparatus includes a separator 22, a cooler 24 that cools first output fluid flowed out from the separator 22, a heater 26 that heats second output fluid flowed out from the separator 22, and a heat collection circuit 30. The distillation apparatus is an apparatus capable of indirectly inputting thermal energy of the first output fluid having relatively low temperature to the second output fluid having relatively high temperature via a working medium.

The separator 22 separates input fluid including a first component and a second component different from the first component into the first output fluid including the first component and the second output fluid including a second component. For example, the first output fluid is distilled stream (distilled liquid) including, as the first component, a lot of components having a low boiling point (high volatility). The second output fluid is column bottom liquor including, as the second component, a lot of components having a boiling point higher than the boiling point of the first component (having volatility lower than the volatility of the first component). Note that the input fluid flows into the separator 22 through, an input channel 11. The first output fluid flows into the cooler 24 through an output channel 12. The second output fluid flows into the heater 26 through an output channel 15.

The cooler 24 causes the first output fluid and the working medium in the heat collection circuit 30 to perform heat exchange to thereby cool the first output fluid. A part of the first output fluid cooled by the heat exchange with the working medium in the cooler 24 is output to the outside through an output channel 13. The remainder is returned to an upper part of the separator 22 through a re-input channel 14. In this embodiment, the cooler 24 is configured to be capable of supplying a cooling medium (cooling water, etc.) into the cooler 24 from an external cooling source (not shown in the figure). Specifically, the cooler 24 includes a cooling medium channel 25 connectable to a cooling-medium supply channel (not shown in the figure) for supplying the cooling medium from the cooling source to the cooler 24. The cooling medium channel 25 includes a connecting section 25a connectable to the cooling-medium supply channel. That is, in this embodiment, the first output fluid can be cooled by both of the working medium and the cooling medium in the cooler 24. However, the cooling medium channel 25 may be omitted.

The heater 26 causes the second output fluid and the working medium of the heat collection circuit 30 to perform heat exchange to thereby heat the second output fluid. A part of the second output fluid heated by the heat exchange with the working medium in the heater 26 is output to the outside through an output channel 16. The remainder is returned to a lower part of the separator 22 through a re-input channel 17. In this embodiment, the heater 26 is configured to be capable of supplying a heating medium (steam, etc.) into the heater 26 from an external heat source (not shown in the figure). Specifically, the heater 26 includes a heating medium channel 27 connectable to a heating-medium supply channel (not shown in the figure) for supplying the heating medium from the heat source to the heater 26. The heating medium channel 27 includes a connecting section 27a connectable to the heating-medium supply channel. That is, in this embodiment, the second output fluid can be heated by both of the working medium and the heating medium in the heater 26. However, the heating medium channel 27 may be omitted.

The heat collection circuit 30 is a circuit that gives thermal energy received from the first output fluid by the working medium according to heat exchange of the working medium with the first output fluid in the cooler 24 to the second output fluid according to heat exchange of the working medium with the second output fluid in the heater 26. That is, the heat collection circuit 30 functions as a so-called heat pump that carries heat from the first output fluid having relatively low temperature to the second output fluid having relatively high temperature via the working medium. Specifically, the heat collection circuit 30 includes a circulation channel 32 in which the working medium circulates, a compressor 34 that compresses the working medium, and an expanding mechanism 36 that expands the working medium.

The circulation channel 32 connects the cooler 24, the compressor 34, the heater 26, and the expanding mechanism 36 in series in this order without being connected to a channel in which the first output fluid and the second output fluid flow. A gas-liquid separator 37 is provided in a part between the cooler 24 and the compressor 34 in the circulation channel 32. Note that the gas-liquid separator 37 may be omitted.

The compressor 34 is provided in a part on a downstream side of the cooler 24 and an upstream side of the heater 26 in the circulation channel 32. The compressor 34 compresses the working medium in a gas state flowed out from the cooler 24 to thereby raise temperature. The working medium in the gas state flowed out from the compressor 34 flows into the heater 26 and performs beat exchange with the second output fluid in the heater 26 to thereby change to a liquid state.

The expanding mechanism 36 is provided in a part on the downstream side of the heater 26 and the upstream side of the cooler 24 in the circulation channel 32. The expanding mechanism 36 expands the working medium in the liquid state flowed out from the heater 26 to thereby reduce pressure. The working medium in the liquid state flowed out from the expanding mechanism 36 flows into the cooler 24 and performs heat exchange with the first output fluid in the cooler 24 to thereby change to the gas state.

As explained above, in the distillation apparatus, the thermal energy of the first output fluid flowed out from the separator 22 is not directly input to the second output fluid by the first output fluid itself and is indirectly input to the second output fluid via the working medium circulating in the circulation channel 32. Specifically, the thermal energy of the first output fluid is collected by the working medium according to the heat exchange with the first output fluid and the working medium in the cooler 24 and thereafter given to the second output fluid by the heat exchange of the working medium and the second output fluid in the heater 26. That is, in the distillation apparatus, the first output fluid itself is not compressed in the compressor 34 as an exchange medium of the thermal energy, the working medium circulating in the circulation channel 32 is compressed in the compressor 34 as the exchange medium. Therefore, even when the first output fluid includes a component, direct compression of which is difficult, as the first component, it is possible to effectively collect the thermal energy of the first output fluid via the working medium (reduce the thermal energy supplied to the heater 26).

In other words, in the distillation apparatus, the effective collection of the thermal energy of the first output fluid is achieved by simply providing the single compressor 34 and the single expanding mechanism 36 with respect to the circulation channel 32.

The heat collection circuit 30 in this embodiment further includes means for increasing and reducing, according to an increase and a decrease in a flow rate of the first output fluid, a total amount (hereinafter referred to as "circulation amount") of the working medium circulating in the circulation channel 32. In the distillation apparatus, when the flow rate of the first output fluid flowing out from the separator 22 fluctuates, thermal energy that the working medium can collect from the first output fluid in the cooler 24 also fluctuates. Therefore, it is possible to more effective collect the thermal energy of the first output fluid by increasing and reducing the circulation amount of the working medium, which is the exchange medium of the thermal energy, according to the increase and the decrease in the flow rate of the first output fluid. Specifically, the heat collection circuit 30 in this embodiment further includes a storing section 40 connected to the circulation channel 32 and a circulation-amount adjusting section 50 capable of adjusting the circulation amount of the working medium circulating in the circulation channel 32.

The storing section 40 includes a storage channel 42 connected to the circulation channel 32 and a tank 44 provided in the storage channel 42.

The storage channel 42 is connected to the circulation channel 32 to be parallel to a part where the working medium in the liquid state is flowing in the circulation channel 32. Specifically, the end portion on the upstream side of the storage channel 42 is connected to a part on the downstream side of the heater 26 and on the upstream side of the expanding mechanism 36 in the circulation channel 32. On the other hand, the end portion on the downstream side of the storage channel 42 is connected to a part between a connecting section of the circulation channel 32 and the end portion on the upstream side of the storage channel 42, and the expanding mechanism 36, in the circulation channel 32. That is, in this embodiment, the working medium in the liquid state condensed by heat exchange with the second output fluid in the heater 26 is stored in the storage channel 42.

The tank 44 stores the working medium in the liquid state. In the tank 44, a detector 44a capable of detecting a storage amount of the working medium in the tank 44 is provided. The working medium in the liquid state separated by the gas-liquid separator 37 flows into the tank 44 through a channel 38.

The circulation-amount adjusting section 50 increases and reduces the circulation amount in the circulation channel 32 according to the increase and the decrease in the flow rate of the first output fluid. Specifically, the circulation-amount adjusting section 50 adjusts an outflow amount of the working medium, which is stored in the storage channel 42 and the tank 44, to the circulation channel 32 or an inflow amount into the storage channel 42 and the tank 44 of the working medium circulating in the circulation channel 32 such that the circulation amount increases or decreases according to the increase or the decrease in the flow rate of the first output fluid. In this embodiment, the circulation-amount adjusting section 50 includes a flow rate sensor 18, a first on-off valve 51, a second on-off valve 52, a first pump 53, a second pump 54, and a control section 55.

The flow rate sensor 18 is a sensor capable of detecting the flow rate of the first output fluid. In this embodiment, the flow rate sensor 18 is provided in the output channel 12 that connects the separator 22 and the cooler 24. However, flow rate sensors 18 may be provided in both of the output channel 13 for outputting the first output fluid from the cooler 24 to the outside and the re-input channel 14 for returning the first output fluid flowed out from the cooler 24 to the separator 22. In this case, the flow rate of the first output fluid is calculated according to a total of detection values of the flow rate sensors 18.

The first on-off valve 51 is provided in a part further on the upstream side than a part where the tank 44 is provided in the storage channel 42. The second on-off valve 52 is provided in a part further on the downstream side than the part where the tank 44 is provided in the storage channel 42. Both of the first on-off valve 51 and the second on-off valve 52 are closed, whereby a part between the first on-off valve 51 and the second on-off valve 52 in the storage channel 42 is cut off from the circulation channel 32.

The first pump 53 is provided in a part between the first on-off valve 51 and the tank 44 in the storage channel 42. The first pump 53 pressurizes the working medium in the liquid state to predetermined pressure and feeds the working medium to the downstream side (the tank 44 side) of the first pump 53 in the storage channel 42. That is, the first pump 53 is a pump for causing the working medium in the liquid state from the circulation channel 32 to flow into the storage channel 42 and the tank 44. Note that the first pump 53 may be provided in a part on the upstream side of the first on-off valve 51 in the storage channel 42.

The second pump 54 is provided in a part between the tank 44 and the second on-off valve 52 in the storage channel 42. The second pump 54 pressurizes the working; medium in the liquid state to predetermined pressure and feeds the working medium to the downstream side (the second on-off valve 52 side) of the second pump 54 in the storage channel 42. That is, the second pump 54 is a pump for causing the working medium in the liquid state from the storage channel 42 and the tank 44 to flow out to the circulation channel 32. Note that the second pump 54 may be provided in a part on the downstream side of the second on-off valve 52 in the storage channel 42.

As the first pump 53 and the second pump 54, a centrifugal pump including an impeller as a rotor, a gear pump in which a rotor consists of a pair of gears, or the like is used. The first pump 53 and the second pump 54 are respectively configured to be capable of being driven at any number of revolutions.

The control section 55 is connected to the flow rate sensor 18, the first on-off valve 51, the second on-off valve 52, the first pump 53, the second pump 54, the detector 44a, and the compressor 34. The control section 55 adjusts opening and closing of the on-off valves 51 and 52, the numbers of revolutions of the pumps 53 and 54, and the number of revolutions of the compressor 34 to increase the circulation amount when the flow rate of the first output fluid (a detection value of the flow rate sensor 18) increases and reduce the circulation amount when the flow rate of the first output fluid decreases.

Control content of the control section 55 is explained with reference to FIG. 2.

When the distillation apparatus is started, the control section 55 detects a detection value of the flow rate sensor 18 (step ST11) and determines, on the basis of the detection value, a reference value (hereinafter referred to as "threshold $Q_{L-SV}$") of the circulation amount for circulating the working medium in the circulation channel 32 (step ST12). The threshold $Q_{L-SV}$ is set to an amount in which the working medium is capable of collecting as large an amount of thermal energy as possible from the first output fluid in the cooler 24. The threshold $Q_{L-SV}$ is desirably set to an amount in which the working medium performs heat exchange of substantially only latent heat with the first output fluid in the cooler 24 (the working medium in the liquid state flows into the cooler 24 and flows out from the cooler 24 in a gas state in which the working medium is not overheated or is slightly overheated). In this embodiment, in the control section 55, data of an optimum threshold $Q_{L-SV}$ corresponding to the detection value of the flow rate sensor 18 is stored in advance. The control section 55 determines the threshold $Q_{L-SV}$ corresponding to the detection value by referring to the data.

Subsequently, the control section 55 determines the number of revolutions of the compressor 34 such that the circulation amount of the working medium circulating in the circulation channel 32 can be set to the threshold $Q_{L-SV}$ (step ST13).

A heating amount of the second output fluid in the heater 26 is sometimes insufficient only with a heat quantity input to the heater 26 via the working medium. In this case, the control section 55 determines a flow rate of a heating medium supplied to the heating medium channel 27 from the outside in order to supplement the insufficiency (step ST14). Similarly, a cooling amount of the first output fluid in the cooler 24 is sometimes insufficient only with a heat quantity collected from the cooler 24 via the working medium. In this case, the control section 55 determines a flow rate of a cooling medium supplied to the cooling medium channel 25 from the outside in order to supplement the insufficiency (step ST15).

Subsequently, the control section 55 detects a storage amount $Q_{VS-PV}$ of the working medium in the tank 44 front a detection value of the detector 44a and subtracts the storage amount $Q_{VS-PV}$ from a total amount $Q_{total}$ of the working medium measured in advance to thereby calculate a present circulation amount $Q_{L-PV}$, which is a circulation amount of the working medium circulating in the circulation channel 32 at that point in time (step ST16).

Thereafter, the control section 55 determines whether the present circulation amount $Q_{L-PV}$ of the circulation channel 32 is insufficient, that is, whether a value obtained by subtracting the storage amount $Q_{VS-PV}$ from the total amount $Q_{total}$ of the working medium is smaller than the threshold $Q_{L-SV}$ (step ST17).

As a result, when the present circulation amount $Q_{L-PV}$ is insufficient (Yes in step ST17), the control section 55 closes the first on-off valve 51, stops the first pump 53, adjusts the number of revolutions of the second pump 54, and opens the second on-off valve 52 (step ST18). Then, the working medium in the liquid state stored in the storage channel 42 and the tank 44 flows out to the circulation channel 32. Consequently, the circulation amount of the working medium in the circulation channel 32 increases. Thereafter, the control section 55 returns to step ST11.

On the other hand, when the present circulation amount $Q_{L-PV}$ is not insufficient (No in step ST17), the control section 55 determines whether the present circulation amount $Q_{L-PV}$ is excessive, that is, whether the value obtained by subtracting the storage amount $Q_{VS-PV}$ from the total amount $Q_{total}$ of the working medium is larger than the threshold $Q_{L-SV}$ (step ST19).

As a result, when the present circulation amount $Q_{L-PV}$ is excessive (Yes in step ST19), the control section 55 opens the first on-off valve 51, adjusts the number of revolutions of the first pump 53, stops the second pump 54, and closes the second on-off valve 52 (step ST20). Then, the working medium in the liquid state flows into the storage channel 42 and the tank 44 from the circulation channel 32. Consequently, the circulation amount of the working medium in the circulation channel 32 decreases. Thereafter, the control section 55 returns to step ST11.

On the other hand, when the present circulation amount $Q_{L-PV}$ is not excessive (No in step ST19), that is, when the present circulation amount $Q_{L-PV}$ and the threshold $Q_{L-SV}$ coincide with each other, the control section 55 directly returns to step ST11.

As explained above, in the distillation apparatus, even when fluctuation occurs in the flow rate of the first output fluid flowed out from the separator 22, it is possible to effectively collect the thermal energy of the first output fluid according to the fluctuation. That is, since the apparatus includes the storing section 40 (the storage channel 42 and the tank 44) and the circulation-amount adjusting section 50, even when the thermal energy collectable from the first output fluid according to the increase and the decrease in the flow rate of the first output fluid, the thermal energy of the first output fluid is effectively collected according to the fluctuation in the flow rate.

In this embodiment, since the circulation amount increases or decreases according to the increase or the decrease in the flow rate of the first output fluid (the detection value of the flow rate sensor 18), collection efficiency of the thermal energy of the first output fluid is further improved. Specifically, when the circulation amount is increased, that is, when the first on-off valve 51 is closed and the second on-off valve 52 is open, the second pump 54 is driven such that the outflow of the working medium from the storage channel 42 and the tank 44 to the circulation channel 32 is facilitated. Conversely, when the circulation amount is reduced, that is, when the first on-off valve 51 is open and the second on-off valve 52 is closed, the first pump 53 is driven such that the inflow of the working medium into the storage channel 42 and the tank 44 from the circulation channel 32 is facilitated. Therefore, the circulation amount increases or decreases according to the increase or the decrease in the flow rate of the first output fluid. Therefore, the collection efficiency of the thermal energy of the first output fluid is further improved. That is, in this embodiment, the first pump 53 and the second pump 54 configure a "facilitating section" that facilitates the outflow of the working medium from the storing section 40 to the circulation channel 32 or the inflow of the working medium from the circulation channel 32 into the storing section 40. Note that the distillation apparatus only has to include at least one of the first pump 53 and the second pump 54 and desirably includes the second pump 54.

In this embodiment, the control section 55 closes the first on-off valve 51 and opens the second on-off valve 52 when the circulation amount is smaller than the threshold $Q_{L-SV}$ and opens the first on-off valve 51 and closes the second on-off valve 52 when the circulation amount is larger than the threshold $Q_{L-SV}$. Therefore, the circulation amount follows the threshold $Q_{L-SV}$ determined at any time on the basis of the detection value of the flow rate sensor 18. In this embodiment, as the threshold $Q_{L-SV}$, the amount of the working medium capable of collecting as large an amount of thermal energy as possible from the first output fluid is set.

Therefore, the collection efficiency of the thermal energy of the first output fluid further increase.

In this embodiment, since the working medium in the liquid state is stored in the storing section 40, a flow rate of the storable working medium increases. That is, it is possible to store a larger amount of the working medium than when the working medium in the gas state is stored in the storing section 40.

Further, in this embodiment, since the storing section 40 includes the tank 44, the circulation amount can more flexibly follow the fluctuation in the first output fluid, that is, it is possible to further improve the collection efficiency of the thermal energy of the first output fluid. Note that the tank 44 may be omitted.

In this embodiment, the heater 26 includes the heating medium channel 27. Therefore, even when the heating amount of the second output fluid in the heater 26 is insufficient only with the heat quantity input to the heater 26 via the working medium, it is possible to supplement the insufficiency by supplying the heating medium to the heater 26 from the outside.

In this embodiment, the cooler 24 includes the cooling medium channel 25. Therefore, even when the cooling amount of the first output fluid in the cooler 24 is insufficient only with the heat quantity collected from the cooler 24 via the working medium, it is possible to supplement the insufficiency by supplying the cooling medium to the cooler 24 from the outside.

Second Embodiment

Figure 3:
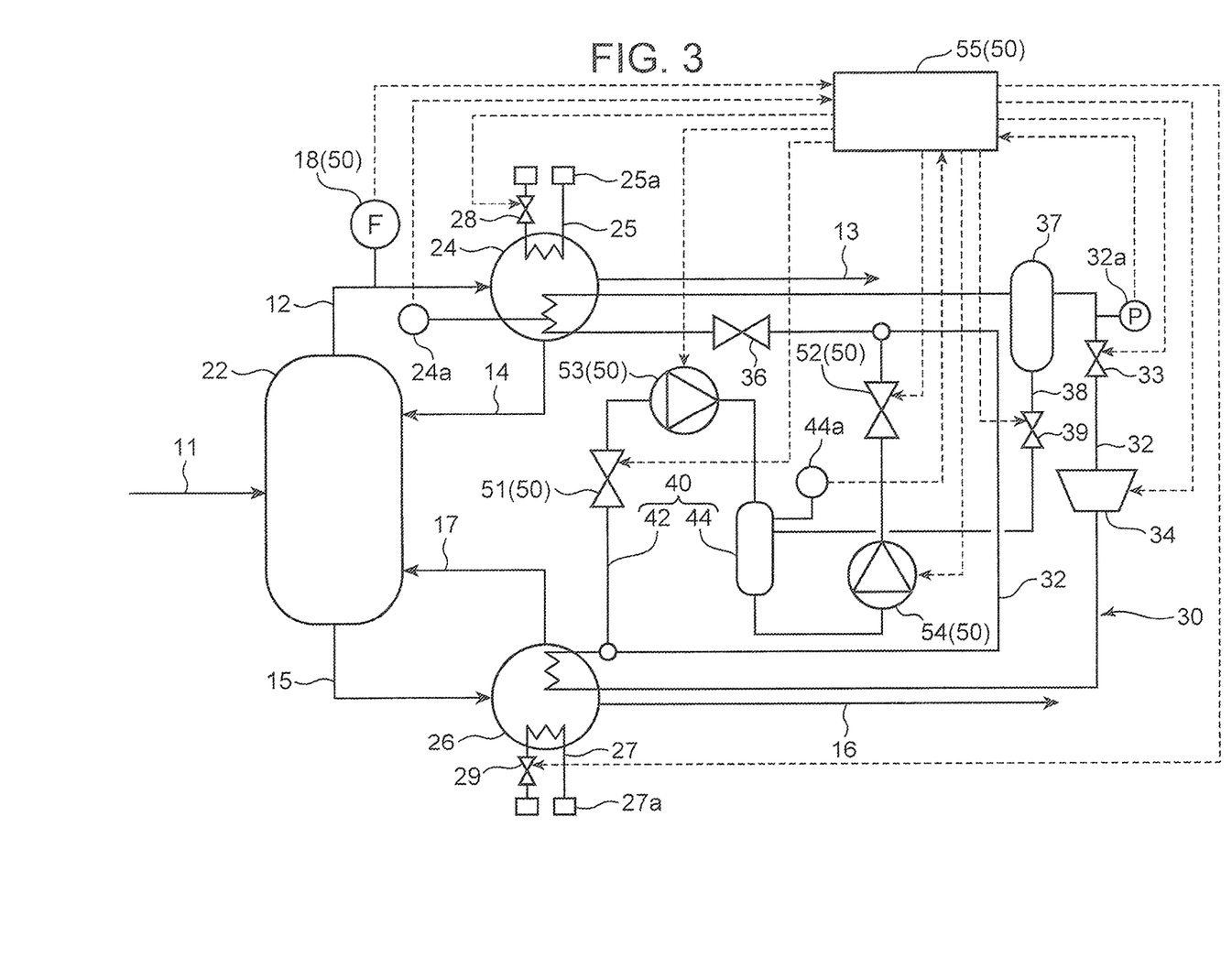
FIG. 3 is a diagram showing an overview of the configuration of a distillation apparatus in a second embodiment of the present invention.
Figure 4:
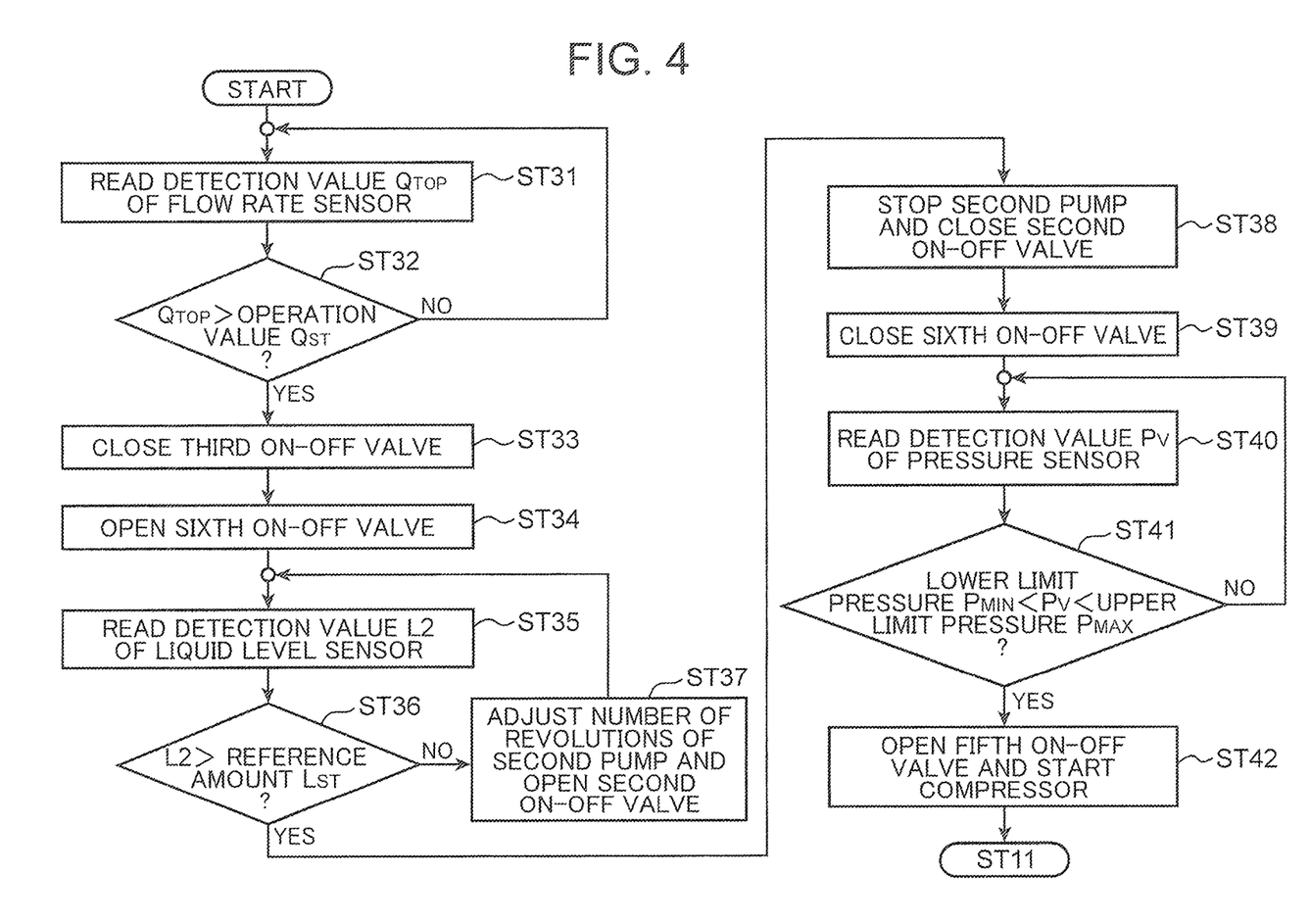
FIG. 4 is a flowchart showing control content of a control section during startup of a heat collection circuit in the distillation apparatus shown in FIG. 3.
Figure 5:
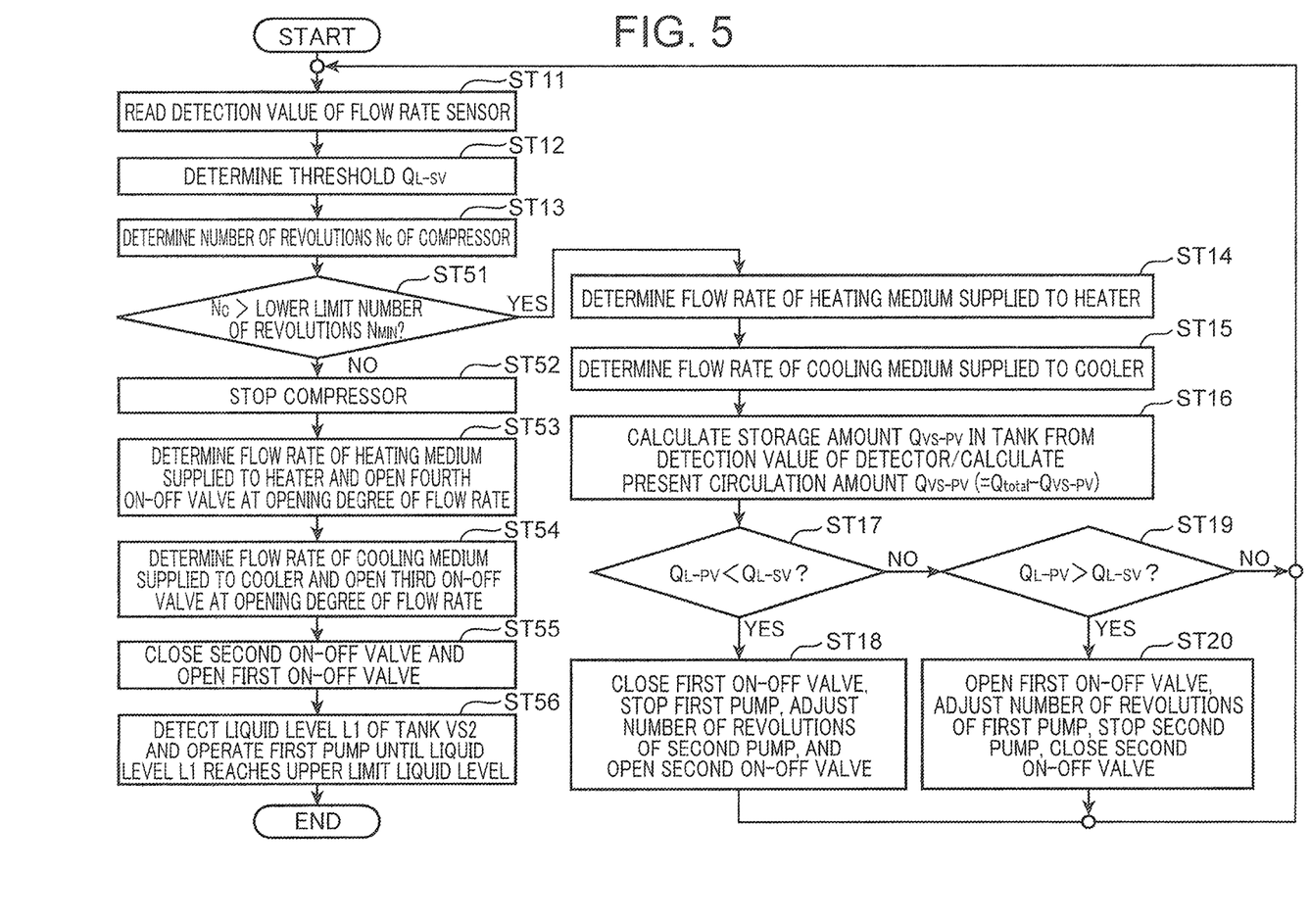
FIG. 5 is a flowchart showing control content of the control section during shutdown of the heat collection circuit in the distillation apparatus shown in FIG. 3.

Next, a distillation apparatus in a second embodiment of the present invention is explained with reference to FIG. 3 to FIG. 5. Note that in the second embodiment, only portions different from the portions in the first embodiment are explained. Explanation of structures, action, and effects same as the structures, the action, and the effect in the first embodiment is omitted.

In this embodiment, the distillation apparatus further includes a liquid level sensor 24a provided in the cooler 24, a third on-off valve 28 provided in the cooling medium channel 25, a fourth on-off valve 29 provided in the heating medium channel 27, a pressure sensor 32a and a fifth on-off valve 33 provided in the circulation channel 32, and a sixth on-off valve 39 provided in the channel 38 that connects the gas-liquid separator 37 and the tank 44. The liquid level sensor 24a detects a storage amount of the working medium in the liquid state in the cooler 24. The fifth on-off valve 33 is provided in a part between the gas-liquid separator 37 and the compressor 34 in the circulation channel 32. The pressure sensor 32a is provided in a part between the gas-liquid separator 37 and the fifth on-off valve 33 in the circulation channel 32.

Control content of the control section 55 during startup (during start) of the heat collection circuit 30 in the distillation apparatus in this embodiment is explained with reference to FIG. 4. In a state before the startup of the heat collection circuit 30, the compressor 34, the first pump 53, and the second pump 54 are stopped and the fifth on-off valve 33 and the sixth on-off valve 39 are closed. The third on-off valve 28 is open in order to cool the first output fluid in the cooler 24.

In this state, first, the control section 55 reads a detection value $Q_{TOP}$ of the flow rate sensor 18 (step ST31) and determines whether the detection value $Q_{TOP}$ is larger than an operation value $Q_{ST}$ set in advance (step ST32). The operation value $Q_{ST}$ is set to an amount capable of operating the heat collection circuit 30, that is, an amount capable of giving thermal energy received from the first output fluid by the working medium according to the driving of the compressor 34 to the second output fluid.

When the detection value $Q_{TOP}$ is equal to or smaller than the operation value $Q_{ST}$ (No in step ST32), the control section 55 returns to step ST31. On the other hand, when the detection value $Q_{TOP}$ is larger than the operation value $Q_{ST}$ (Yes in step S132), the control section 55 closes the third on-off valve 28 (step ST33) and opens the sixth on-off valve 39 (step ST34). The third on-off valve 28 is closed because the cooling of the first output fluid is enabled by the working medium in the liquid state in the cooler 24. The sixth on-off valve 39 is opened in order to lead the working medium in the liquid state accumulated in the gas-liquid separator 37 into the tank 44.

Subsequently, the control section 55 reads a detection value L2 of the liquid level sensor 24a (step ST35) and determines whether the detection value L2 is larger than a reference amount $L_{ST}$ set in advance (step ST36). The reference amount $L_{ST}$ is set to an amount in which the working medium in the gas state in an amount capable of stably rotating the compressor 34 (at the number of revolution equal to or larger than a lower limit number of revolutions $N_{MIN}$) is obtained.

When the detection value L2 is equal to or smaller than the reference amount $L_{ST}$ (No in step ST36), the control section 55 adjusts the number of revolutions of the second pump 54 and opens the second on-off valve 52 (step ST37) and thereafter returns to step ST35. Then, the working medium in the liquid state flows out from the tank 44 to the circulation channel 32. Consequently, an amount of the working medium in the liquid state in the cooler 24 increases.

On the other hand, when the detection value L2 is larger than the reference amount $L_{ST}$ (Yes in step S136), the control section 55 stops the second pump 54 and closes the second on-off valve 52 (step ST37).

Thereafter, the control section 55 closes the sixth on-off valve 39 (step ST39). The control section 55 closes the sixth on-off valve 39 in order to block communication between the gas-liquid separator 37 and the tank 44 to thereby accumulate the working medium in the gas state in a space between the cooler 24 and the fifth on-off valve 33 in the circulation channel 32.

Subsequently, the control section 55 reads a detection value $P_V$ of the pressure sensor 32a (step ST40) and determines whether the detection value $P_V$ is larger than a lower limit pressure $P_{MIN}$ set in advance and smaller than an upper limit pressure $P_{MAX}$ set in advance (step ST41).

As a result, when the detection value $P_V$ is equal to or smaller than the lower limit pressure $P_{MIN}$ and equal to or larger than the upper limit pressure $P_{MAX}$ (No in step ST41), the control section 55 returns to step ST40. On the other hand, when the detection value $P_V$ is larger than the lower limit pressure $P_{MIN}$ and smaller than the upper limit pressure $P_{MAX}$ (Yes in step ST41), the control section 55 opens the fifth on-off valve 33 and drives the compressor 34 (step ST42). Consequently, the heat collection circuit 30 starts up. Thereafter, the control section 55 shifts to step ST11.

Subsequently, control content of the control section 55 during shutdown (during stop) of the heat collection circuit 30 is explained with reference to FIG. 5. In the following explanation, steps same as the steps in the control content of the control section 55 in the first embodiment are denoted by reference signs same as the reference signs in the first embodiment and explanation of the steps is omitted.

The control section 55 determines the number of revolutions $N_C$ of the compressor 34 (step ST13) and thereafter determines whether the number of revolutions $N_C$ is larger than a lower limit number of revolutions $N_N$ (step ST51). The lower limit number of revolutions $N_{MIN}$ is set to a lower limit value in a range of the number of revolutions in which the compressor 34 can stably rotate.

When the number of revolutions $N_C$ is larger than the lower limit number of revolutions $N_{MIN}$ (Yes in step ST51), the control section 55 shifts to step ST14. Control content in step ST14 to step ST20 is the same as the control content in the first embodiment. Therefore, explanation of the control content is omitted.

On the other hand, when the number of revolutions $N_C$ is equal to or smaller than the lower limit number of revolutions $N_{MIN}$ (No in step ST51), the control section 55 stops the compressor 34 (step ST52). The control section 55 determines a flow rate of the heating medium supplied to the heater 26 and opens the fourth on-off valve 29 at an opening degree of the flow rate (step ST53). The control section 55 determines a flow rate of the cooling medium supplied to the cooler 24 and opens the third on-off valve 28 at an opening degree of the flow rate (step ST54).

Thereafter, the control section 55 drives the first pump 53 until a detection value L2 of the detector 44a reaches an upper limit value set in advance (step ST56). Consequently, the heat collection circuit 30 shuts down in a state in which a predetermined amount of the working medium in the liquid state is stored in the tank 44.

The shutdown of the heat collection circuit 30 explained above may be manually performed. In this case, the compressor 34 is stopped by operation of an operation button (not shown in the figure) for manually operating the driving and the stop of the compressor 34. Control content of the control section 55 after the stop of the compressor 34 is the same as step ST53 to step ST56.

As explained above, in this embodiment, the control section 55 drives the compressor 34 when the detection value $Q_{TOP}$ of the flow rate sensor 18 has become larger than the operation value $Q_{ST}$. Therefore, the heat collection circuit 30 automatically starts up (starts) when the detection value $Q_{TOP}$ has become larger than the operation value $Q_{ST}$. Therefore, it is possible to more effectively collect the thermal energy of the first output fluid.

More specifically, the control section 55 drives the compressor 34 when the detection value $Q_{TOP}$ has become larger than the operation value $Q_{ST}$ and the detection value L2 of the liquid level sensor 24a has become larger than the reference amount $L_{ST}$. That is, the compressor 34 is driven after an amount of the working medium in the liquid state evaporating by receiving the thermal energy from the first output fluid in the cooler 24, that is, an amount of the working medium in the gas state flowing into the compressor 34 after evaporating in the cooler 24 is sufficiently secured. Therefore, the start of the heat collection circuit 30 stabilizes.

The control section 55 stops the compressor 34 when the number of revolutions $N_C$ of the compressor 34 has become smaller than the lower limit number of revolutions $N_{MIN}$. Therefore, the heat collection circuit 30 automatically shuts down (stops) when the number of revolutions $N_C$ of the compressor 34 has become smaller than the lower limit number of revolutions $N_{MIN}$. Therefore, since a stable driving state of the compressor 34 is secured, it is possible to avoid driving in an unstable state of the heat collection circuit 30.

Note that the embodiments disclosed herein should be considered illustrative and not limiting in all aspects. The scope of the present invention is indicated by claims rather than the above explanation of the embodiments and includes all changes within meanings and scopes equivalent to the claims.

For example, in the embodiments, the example is explained in which the control section 55 determines the threshold $Q_{L-SV}$ corresponding to the detection value of the flow rate sensor 18 at any time by referring to the data stored in the control section 55. However, a method of determining the threshold $Q_{total}$ is not limited to this. For example, as the threshold $Q_{L-SV}$, a specific setting value may be set on the basis of a fluctuation range of the first output fluid, the total amount $Q_{total}$, and the like. In this case, the control section 55 may close the first on-off valve 51 and open the second on-off valve 52 when the detection value of the flow rate sensor 18 is larger than the setting value. The control section 55 may open the first on-off valve 51 and close the second on-off valve 52 when the detection value is smaller than the setting value.

Here, the embodiments are generally explained.

The distillation apparatus in the embodiments includes: a separator that separates input fluid including a first component and a second component into first output fluid including the first component and second output fluid including the second component; a cooler for cooling the first output fluid flowed out from the separator; a heater for heating the second output fluid flowed out from the separator; and a heat collection circuit that includes a working medium and gives thermal energy, received from the first output fluid as a result of heat exchange of the working medium with the first output fluid in the cooler, to the second output fluid as a result of heat exchange of the working medium with the second output fluid in the heater, wherein the heat collection circuit includes: a circulation channel that connects the cooler and the heater and circulates the working medium; a compressor that performs heat exchange with the first output fluid in the cooler to thereby compress the working medium after receiving the thermal energy from the first output fluid; an expanding mechanism that performs heat exchange with the second output fluid in the heater to thereby expand the working medium after giving the thermal energy to the second output fluid; a storing section connected to the circulation channel and being capable of storing the working medium in a liquid state; and a circulation-amount adjusting section that adjusts a circulation amount, which is a total amount of the working medium circulating in the circulation channel, and the circulation-amount adjusting section adjusts an outflow amount of the working medium, which is stored in the storing section, to the circulation channel or an inflow amount of the working medium, which is circulating in the circulation channel, to the storing section such that the circulation amount increases or decreases according to an increase or a decrease in a flow rate of the first output fluid.

In the apparatus, the thermal energy of the first output fluid flowed out from the separator is not directly input to the second output fluid by the first output fluid itself and is indirectly input to the second output fluid via the working medium circulating in the circulation channel. Specifically, the thermal energy of the first output fluid is collected by the working medium according to the heat exchange with the first output fluid and the working medium in the cooler and thereafter given to the second output fluid by the heat exchange of the working medium and the second output fluid in the heater. That is, in the apparatus, the first output fluid itself is not compressed by the compressor as an exchange medium of the thermal energy, the working medium circulating in the circulation channel is compressed by the compressor as the exchange medium. Therefore, even when the first output fluid includes a component, direct compression of which is difficult, as the first component, it is possible to effectively collect the thermal energy of the first output fluid via the working medium (reduce the thermal energy supplied to the heater).

Further, even when fluctuation occurs in the flow rate of the first output fluid flowed out from the separator, it is possible to effectively collect the thermal energy of the first output fluid according to the fluctuation. That is, although the thermal energy collectable from the first output fluid also increases or decreases according to an increase or a decrease in the flow rate of the first output fluid, since the apparatus includes the storing section capable of storing the working medium in the liquid state and the circulation-amount adjusting section that adjusts the circulation amount, the thermal energy of the first output fluid is effectively collected according to the fluctuation in the flow rate of the first output fluid. More specifically, since the working medium in the liquid state is stored in the storing section, it is possible to store a larger amount of the working medium than when the working medium in a gas state is stored in the storing section. Therefore, it is possible to flexibly cope with large fluctuation in the flow rate of the first output fluid.

In this case, it is desirable that the storing section includes a storage channel connected to the circulation channel to be parallel to a part where the working medium in the liquid state flows in the circulation channel, the circulation-amount adjusting section includes: a first on-off valve provided in the storage channel; a second on-off valve provided in a part further toward a downstream side than a part where the first on-off valve is provided in the storage channel; a flow rate sensor that is capable of detecting a flow rate of the first output fluid flowing into the cooler or a flow rate of the first output fluid flowed out from the cooler; and a control section that controls opening and closing of the first on-off valve and the second on-off valve according to a detection value of the flow rate sensor, and the control section closes the first on-off valve and opens the second on-off valve or opens the first on-off valve and closes the second on-off valve such that the circulation amount increases or decreases according to an increase or a decrease of the detection value.

Consequently, it is possible to adjust the circulation amount according to the flow rate of the first output fluid with a simple configuration in which the two on-off valves for cutting off the storage channel from the circulation channel, the flow rate sensor that detects the flow rate of the first output fluid, and the control section that controls opening and closing of the on-off valves are provided.

In this case, it is preferable that the circulation-amount adjusting section further includes a facilitating section that facilitates outflow of the working medium in the liquid state from the storage channel to the circulation channel when the first on-off valve is closed and the second on-off valve is open and facilitates inflow of the working medium in the liquid state from the circulation channel to the storage channel when the first on-off valve is open and the second on-off valve is closed.

Consequently, since the circulation amounts smoothly increases or decreases according to an increase or a decrease in the flow rate of the first output fluid (the detection value of the flow rate sensor), collection efficiency of the thermal energy of the first output fluid is further improved. Specifically, when the circulation amount is increased, that is, when the first on-off valve is closed and the second on-off valve is open, the facilitating section facilitates the outflow of the working medium in the liquid state from the storage channel to the circulation channel. Conversely, when the circulation amount is reduced, that is, when the first on-off valve is open and the second on-off valve is closed, the facilitating section facilitates the inflow of the working medium in the liquid state from the circulation channel to the storage channel. Therefore, the circulation amount smoothly increases or decreases according to the increase or the decrease in the flow rate of the first output fluid. Therefore, the collection efficiency of the thermal energy of the first output fluid is further improved.

In the apparatus, it is preferable that the control section closes the first on-off valve and opens the second on-off valve when the circulation amount is smaller than a threshold determined on the basis of the detection value and opens the first on-off valve and closes the second on-off valve when the circulation amount is larger than the threshold.

Consequently, the circulation amount follows the threshold determined at any time on the basis of the detection value of the flow rate sensor. Therefore, an amount of the working medium capable of collecting as large an amount of thermal energy as possible from the first output fluid is set as the threshold, whereby the collection efficiency of the thermal energy of the first output fluid is further improved.

In the apparatus, it is preferable that the storing section further includes a tank that is provided in a part between the first on-off valve and the second on-off valve in the storage channel and stores the working medium in the liquid state.

Consequently, it is possible to store a larger amount of the working medium. Therefore, the circulation amount can more flexibly follow the fluctuation in the first output fluid, that is, it is possible to further improve the collection efficiency of the thermal energy of the first output fluid.

In the apparatus, it is preferable that the heater includes a heating medium channel connectable to a heating-medium supply channel for supplying a heating medium to the heater.

Consequently, even when a heating amount of the second output fluid in the heater is insufficient only with a heat quantity input to the heater via the working medium, it is possible to supplement the insufficiency by supplying the heating medium to the heater from the outside.

In the apparatus, it is preferable that the cooler includes a cooling medium channel connectable to a cooling-medium supply channel for supplying a cooling medium to the cooler.

Consequently, even when a cooling amount of the first output fluid in the cooler is insufficient only with a heat quantity collected from the cooler via the working medium, it is possible to supplement the insufficiency by supplying the cooling medium to the cooler from the outside.

In the apparatus, it is preferable that the control section drives the compressor when the detection value of the flow rate sensor has become larger than an operation value set in advance.

Consequently, the heat collection circuit automatically starts up (starts) when the detection value of the flow rate sensor has become larger than the operation value. Therefore, it is possible to more effectively collect the thermal energy of the first output fluid.

In this case, it is preferable that the heat collection circuit further includes a liquid level sensor that is capable of detecting a storage amount of the working medium in the liquid state in the cooler, and the control section drives the compressor when the detection value of the flow rate sensor has become larger than the operation value and a detection value of the liquid level sensor has become larger than a reference amount set in advance.

Consequently, the compressor is driven after an amount of the working medium in the liquid state evaporating by receiving the thermal energy from the first output fluid in the cooler, that is, an amount of the working medium in the gas state flowing into the compressor after evaporating in the cooler is sufficiently secured. Therefore, the start of the heat collection circuit stabilizes.

In the apparatus, it is preferable that the control section stops the compressor when the number of revolutions of the compressor has become smaller than a lower limit number of revolutions set in advance.

Consequently, the heat collection circuit automatically shuts down (stops) when the number of revolutions of the compressor has become smaller than the tower limit number of revolutions. Therefore, it is possible to avoid driving in an unstable state of the heat collection circuit, for example, by setting the lower limit number of revolutions to the number of revolutions in which it is difficult to secure a stable driving state.

The invention claimed is:

1. A distillation apparatus comprising:
a separator that separates input fluid including a first component and a second component into first output fluid including the first component and second output fluid including the second component;
a cooler for cooling the first output fluid flowed out from the separator;
a heater for heating the second output fluid flowed out from the separator; and
a heat collection circuit that includes a working medium and is configured to transfer thermal energy, received from the first output fluid as a result of heat exchange of the working medium with the first output fluid in the cooler, to the second output fluid as a result of heat exchange of the working medium with the second output fluid in the heater, wherein
the heat collection circuit includes: a circulation channel that connects the cooler and the heater and circulates the working medium; a compressor that compresses the working medium having received the thermal energy from the first output fluid by performing heat exchange with the first output fluid in the cooler; an expander that expands the working medium having given the thermal energy to the second output fluid by performing heat exchange with the second output fluid in the heater; a storage connected to the circulation channel and being capable of storing the working medium in a liquid state; and a circulation-amount adjuster that adjusts a circulation amount, which is a total amount of the working medium circulating in the circulation channel, and
the circulation-amount adjuster adjusts an outflow amount of the working medium, which is stored in the storage, to the circulation channel or an inflow amount of the working medium, which is circulating in the circulation channel, to the storage such that the circulation amount increases or decreases according to an increase or a decrease in a flow rate of the first output fluid.

2. The distillation apparatus according to claim 1, wherein the storage includes a storage channel that is connected to the circulation channel in parallel to a part of the circulation channel where the working medium in the liquid state flows in the circulation channel,
the circulation-amount adjuster includes: a first on-off valve provided in the storage channel; a second on-off valve provided in a part further toward a downstream side than a part where the first on-off valve is provided in the storage channel; a flow rate sensor that is capable of detecting a flow rate of the first output fluid flowing into the cooler or a flow rate of the first output fluid flowed out from the cooler; and a controller that controls opening and closing of the first on-off valve and the second on-off valve according to a detection value of the flow rate sensor, and
the controller closes the first on-off valve and opens the second on-off valve or opens the first on-off valve and closes the second on-off valve such that the circulation amount increases or decreases according to an increase or a decrease of the detection value.

3. The distillation apparatus according to claim 2, wherein the circulation-amount adjuster further includes a pump that facilitates outflow of the working medium in the liquid state from the storage channel to the circulation channel when the first on-off valve is closed and the second on-off valve is open and facilitates inflow of the working medium in the liquid state from the circulation channel to the storage channel when the first on-off valve is open and the second on-off valve is closed.

4. The distillation apparatus according to claim 2, wherein the controller is further programmed and configured to close the first on-off valve and open the second on-off valve when the circulation amount is smaller than a threshold determined on the basis of the detection value and open the first on-off valve and closes the second on-off valve when the circulation amount is larger than the threshold.

5. The distillation apparatus according to claim 2, wherein the storage further includes a tank that is provided in a part between the first on-off valve and the second on-off valve in the storage channel and stores the working medium in the liquid state.

6. The distillation apparatus according to claim 1, wherein the heater includes a heating medium channel configured to connect to a heating-medium supply channel for supplying a heating medium to the heater.

7. The distillation apparatus according to claim 1, wherein the cooler includes a cooling medium channel configured to connect to a cooling-medium supply channel for supplying a cooling medium to the cooler.

8. The distillation apparatus according to claim 2, wherein the controller is further programmed and configured to drive the compressor when the detection value of the flow rate sensor has become larger than an operation value set in advance.

9. The distillation apparatus according to claim 8, wherein the heat collection circuit further includes a liquid level sensor that is capable of detecting a storage amount of the working medium in the liquid state in the cooler, and
the controller is further programmed and configured to drive the compressor when the detection value of the flow rate sensor has become larger than the operation value and a detection value of the liquid level sensor has become larger than a reference amount set in advance.

10. The distillation apparatus according to claim 1, wherein the controller is further programmed and configured to stop the compressor when a number of revolutions of the compressor has become smaller than a lower limit number of revolutions set in advance.

* * * * *